United States Patent
Fujdala et al.

(10) Patent No.: US 7,709,414 B2
(45) Date of Patent: *May 4, 2010

(54) ENGINE EXHAUST CATALYSTS CONTAINING PALLADIUM-GOLD

(75) Inventors: Kyle L. Fujdala, San Jose, CA (US); Timothy J. Truex, Oxnard, CA (US); Jifei Jia, El Cerrito, CA (US)

(73) Assignee: NanoStellar, Inc., Redwood City, CA (US)

( * ) Notice: Subject to any disclaimer, the term of this patent is extended or adjusted under 35 U.S.C. 154(b) by 396 days.

This patent is subject to a terminal disclaimer.

(21) Appl. No.: 11/624,128

(22) Filed: Jan. 17, 2007

(65) Prior Publication Data

US 2008/0124514 A1 May 29, 2008

Related U.S. Application Data

(60) Provisional application No. 60/867,335, filed on Nov. 27, 2006.

(51) Int. Cl.
*B01J 23/00* (2006.01)
*B01J 21/00* (2006.01)
*B01J 20/00* (2006.01)

(52) U.S. Cl. .................. 502/326; 502/327; 502/330; 502/332; 502/333; 502/334; 502/339; 502/344; 502/349; 502/350; 502/351; 502/355; 502/415; 502/439; 502/527.13; 502/527.19; 422/170; 422/177; 422/180

(58) Field of Classification Search ................. 502/326, 502/327, 330, 332, 333, 334, 339, 344, 349, 502/350, 351, 355, 415, 439, 527.13, 527.19; 422/170, 177, 180
See application file for complete search history.

(56) References Cited

U.S. PATENT DOCUMENTS 3,929,965 A 12/1975 Kim et al.
4,048,096 A 9/1977 Bissot (Continued)

FOREIGN PATENT DOCUMENTS

EP 0 449 423 10/1991

(Continued)

OTHER PUBLICATIONS

A. Beck, et al., "Genesis of Au-Pd Nanoparticles Supported on SiO$_2$: Structure and Catalytic Activity in CO Oxidation," North American Catalysis Society, Cancun Mexico XP002475084, Jun. 2, 2003, pp. 1-2.

(Continued)

*Primary Examiner*—Cam N Nguyen
(74) *Attorney, Agent, or Firm*—Patterson & Sheridan, LLP

(57) ABSTRACT

An engine exhaust catalyst exhibits improved CO oxidation performance relative to conventional engine exhaust catalysts and includes a first supported catalyst comprising platinum and a second supported catalyst comprising palladium and gold species in close contact. The first supported catalyst may be a platinum catalyst, a platinum—palladium catalyst, or a platinum catalyst promoted with bismuth, and the second supported catalyst preferably has a palladium to gold weight ratio of about 0.85:1.0. To improve aged catalyst performance, the first and second supported catalysts are coated onto different layers, zones, or monoliths of the substrate for the engine exhaust catalyst.

17 Claims, 6 Drawing Sheets

U.S. PATENT DOCUMENTS

| | | | |
|---|---|---|---|
| 4,053,434 A | 10/1977 | McArthur | |
| 4,136,062 A | 1/1979 | Boudart et al. | |
| 4,369,132 A | 1/1983 | Kinoshita et al. | |
| 4,490,481 A | 12/1984 | Boitiaux et al. | |
| 4,499,301 A | 2/1985 | Murib | |
| 4,533,779 A | 8/1985 | Boitiaux et al. | |
| 4,552,860 A | 11/1985 | Murib | |
| 4,931,419 A | 6/1990 | Blanchard et al. | |
| 5,185,308 A | 2/1993 | Bartley et al. | |
| 5,194,417 A | 3/1993 | Smith et al. | |
| 5,234,882 A * | 8/1993 | Pfefferle | 502/314 |
| 5,258,340 A | 11/1993 | Augustine et al. | |
| 5,336,802 A | 8/1994 | Smith et al. | |
| 5,510,086 A * | 4/1996 | Hemingway et al. | 422/171 |
| 5,665,668 A | 9/1997 | Grigorova et al. | |
| 5,693,586 A | 12/1997 | Nicolau et al. | |
| 5,700,753 A | 12/1997 | Wang et al. | |
| 5,702,675 A | 12/1997 | Takeshima et al. | |
| 5,848,356 A | 12/1998 | Jambhekar et al. | |
| 5,849,256 A | 12/1998 | Deeba et al. | |
| 5,894,068 A | 4/1999 | Kharas et al. | |
| 5,911,961 A | 6/1999 | Horiuchi et al. | |
| 5,948,377 A | 9/1999 | Sung | |
| 5,977,012 A | 11/1999 | Kharas et al. | |
| 5,989,507 A * | 11/1999 | Sung et al. | 423/213.5 |
| 6,022,823 A | 2/2000 | Augustine et al. | |
| 6,034,030 A | 3/2000 | Nicolau et al. | |
| 6,087,298 A | 7/2000 | Sung et al. | |
| 6,130,182 A * | 10/2000 | Naeem | 502/328 |
| 6,147,027 A | 11/2000 | Miyake et al. | |
| 6,156,927 A | 12/2000 | Halcom et al. | |
| 6,420,308 B1 | 7/2002 | Khanmamedova | |
| 6,656,873 B2 | 12/2003 | Chaturvedi et al. | |
| 6,685,900 B2 * | 2/2004 | Domesle et al. | 423/213.5 |
| 6,740,615 B2 | 5/2004 | Zhou et al. | |
| 6,763,309 B2 | 7/2004 | Kieken et al. | |
| 6,777,571 B2 | 8/2004 | Chaturvedi et al. | |
| 6,794,332 B2 * | 9/2004 | Khanmamedova | |
| 6,811,868 B2 * | 11/2004 | Hasegawa et al. | 428/325 |
| 6,825,149 B2 | 11/2004 | Khanmamedova | |
| 7,048,894 B2 * | 5/2006 | Tanaka et al. | 422/177 |
| 7,094,730 B2 * | 8/2006 | LaBarge et al. | 502/332 |
| 7,169,735 B2 | 1/2007 | Sagae | |
| 7,287,370 B2 * | 10/2007 | Rajaram et al. | 60/274 |
| 7,550,117 B2 * | 6/2009 | Alward et al. | 422/177 |
| 2004/0087439 A1 * | 5/2004 | Hwang et al. | 502/302 |
| 2005/0095189 A1 * | 5/2005 | Brey et al. | 423/427 |
| 2005/0169807 A1 | 8/2005 | Carpenter et al. | |
| 2005/0197244 A1 | 9/2005 | L'Vovich et al. | |
| 2005/0261125 A1 | 11/2005 | Sagae | |
| 2006/0172886 A1 * | 8/2006 | Shimazu et al. | 502/325 |
| 2007/0065354 A1 * | 3/2007 | Hemingway et al. | 423/235 |
| 2007/0238610 A1 * | 10/2007 | Chen et al. | 502/330 |
| 2008/0003155 A1 * | 1/2008 | Jia et al. | 423/213.5 |
| 2008/0081007 A1 * | 4/2008 | Steele et al. | 422/179 |

FOREIGN PATENT DOCUMENTS

| | | |
|---|---|---|
| EP | 0 707 883 | 4/1996 |
| EP | 1570895 | 7/2005 |
| JP | 09299763 | 11/1997 |
| WO | WO 97/00119 | 1/1997 |
| WO | WO 2005/030382 | 4/2005 |
| WO | WO 2007/001075 | 1/2007 |

OTHER PUBLICATIONS

GB International Search Report.
Extended European Search Report dated Nov. 16, 2009, EP Application No. 07252150.3.
Wu et al. - "Enhancement effect of gold and silver on nitric oxide decomposition over Pd/ $Al_2O_3$ catalysts", Applied Catalysis B: Environmental, vol. 6, 1995, pp. 105-116, XP-002553263.
Anonymous - "Catalytic converter", Wikipedia, the free encyclopedia, [online] Nov. 14, 2005, XP-002553264 [retrieved on Oct. 30, 2009], 3 pages.

* cited by examiner

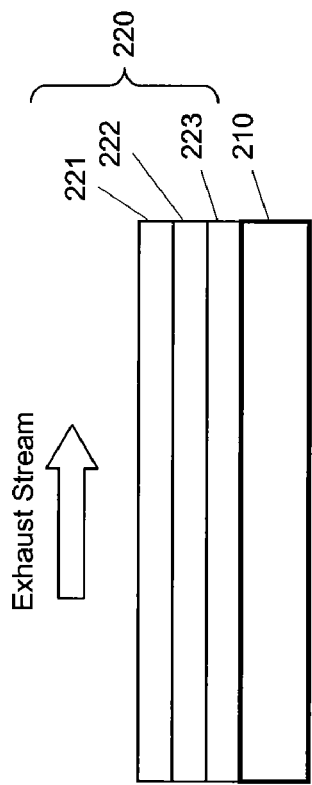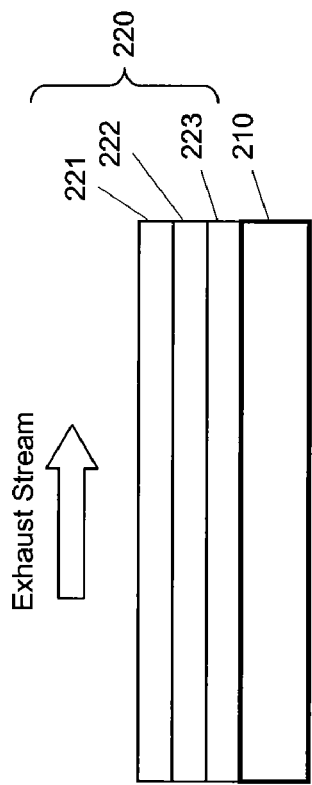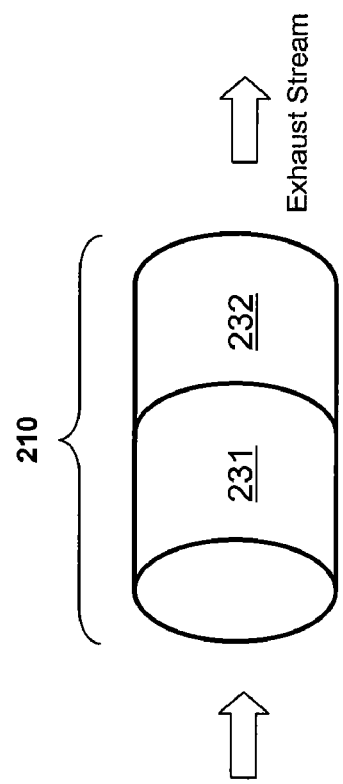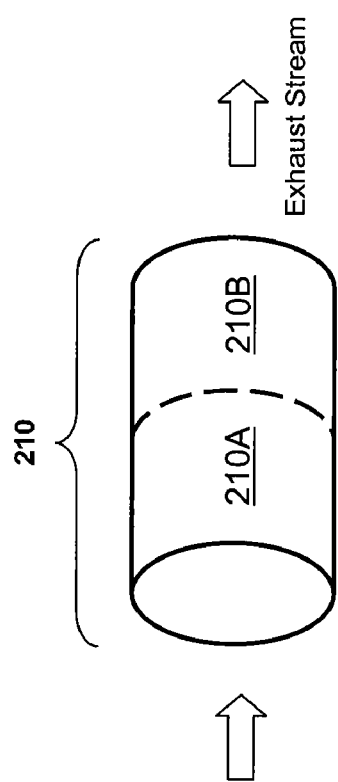

ENGINE EXHAUST CATALYSTS CONTAINING PALLADIUM-GOLD

CROSS-REFERENCE TO RELATED APPLICATIONS

This application claims the benefit of U.S. Provisional Patent Application Ser. No. 60/867,335, filed Nov. 27, 2006, which is herein incorporated by reference.

BACKGROUND OF THE INVENTION

1. Field of the Invention

Embodiments of the present invention generally relate to supported catalysts containing precious group metals and, and more particularly, to engine exhaust catalysts containing palladium and gold, and methods of production thereof.

2. Description of the Related Art

Many industrial products such as fuels, lubricants, polymers, fibers, drugs, and other chemicals would not be manufacturable without the use of catalysts. Catalysts are also essential for the reduction of pollutants, particularly air pollutants created during the production of energy and by automobiles. Many industrial catalysts are composed of a high surface area support material upon which chemically active metal nanoparticles (i.e., nanometer sized metal particles) are dispersed. The support materials are generally inert, ceramic type materials having surface areas on the order of hundreds of square meters/gram. This high specific surface area usually requires a complex internal pore system. The metal nanoparticles are deposited on the support and dispersed throughout this internal pore system, and are generally between 1 and 100 nanometers in size.

Processes for making supported catalysts go back many years. One such process for making platinum catalysts, for example, involves the contacting of a support material such as alumina with a metal salt solution such as hexachloroplatinic acid in water. The metal salt solution "impregnates" or fills the pores of the support during this process. Following the impregnation, the support containing the metal salt solution would be dried, causing the metal salt to precipitate within the pores. The support containing the precipitated metal salt would then be calcined (typically in air) and, if necessary, exposed to a reducing gas environment (e.g., hydrogen or carbon monoxide) for further reduction to form metal particles. Another process for making supported catalysts involves the steps of contacting a support material with a metal salt solution and reducing the metal ions to metal particles in situ using suitable reducing agents.

Supported catalysts are quite useful in removing pollutants from vehicle exhausts. Vehicle exhausts contain harmful pollutants, such as carbon monoxide (CO), unburned hydrocarbons (HC), and nitrogen oxides (NOx), that contribute to the "smog-effect" that have plagued major metropolitan areas across the globe. Catalytic converters containing supported catalysts and particulate filters have been used to remove such harmful pollutants from the vehicle exhaust. While pollution from vehicle exhaust has decreased over the years from the use of catalytic converters and particulate filters, research into improved supported catalysts has been continuing as requirements for vehicle emission control have become more stringent and as vehicle manufacturers seek to use less amounts of precious metal in the supported catalysts to reduce the total cost of emission control.

The prior art teaches the use of supported catalysts containing palladium and gold as good partial oxidation catalysts. As such, they have been used extensively in the production of vinyl acetate in the vapor phase by reaction of ethylene, acetic acid and oxygen. See, e.g., U.S. Pat. No. 6,022,823. As for vehicle emission control applications, U.S. Pat. No. 6,763,309 speculates that palladium—gold might be a good bimetallic candidate for increasing the rate of NO decomposition. The disclosure, however, is based on a mathematical model and is not supported by experimental data. There is also no teaching in this patent that a palladium—gold system will be effective in treating vehicle emissions that include CO and HC.

SUMMARY OF THE INVENTION

The present invention provides engine exhaust catalysts comprising palladium and gold species in close contact that are effective in treating emissions that include CO and HC, and methods for producing the same. The engine may be a vehicle engine, an industrial engine, or generally, any type of engine that burns hydrocarbons. The inventors have enabled the use of supported catalysts comprising palladium and gold species in close contact as engine exhaust catalysts by overcoming the problem which they have discovered through tests that HC species present in the exhaust inhibit the oxidation activity of such catalysts. Embodiments of the present invention reduce such HC inhibition effects sufficiently so that the oxidation activity of the engine exhaust catalyst can be boosted to effective levels. The inventors have confirmed through fresh vehicle performance tests that the engine exhaust catalysts according to embodiments of the present invention perform as well as platinum—palladium catalysts in reducing CO emissions from a vehicle.

The engine exhaust catalyst according to embodiments of the present invention includes a first supported catalyst comprising a catalyst metal, preferably platinum, and a second supported catalyst comprising palladium and gold species in close contact (e.g., as nanoparticles). The first and second supported catalysts are produced separately and coated onto a substrate appropriate for use in an engine exhaust control system. The first supported catalyst provides a boost to the NO and HC oxidation activity, both of which are beneficial to the oxidation activity of palladium—gold . The higher rate of formation of $NO_2$ results in more $NO_2$ which may help to clean HC residue off the palladium—gold surface and reduce the inhibition effects on the oxidation activity of palladium—gold . The higher rate of oxidation of HC reduces the amount of HC species that are available to inhibit the oxidation activity of palladium—gold . The performance gain from use of a palladium—gold catalyst with a platinum-containing catalyst is greater than would be realized from simply using more of the platinum-containing catalyst at equal cost.

According to one embodiment, the first and second supported catalysts are mixed together to form a slurry that is coated onto the substrate. According to other embodiments, the first and second supported catalysts are coated onto the substrate separately. In one example, the first and second supported catalysts may be coated as different layers on the substrate or onto different zones of the substrate. In another example, the substrate comprises a first monolith and a second monolith and the first supported catalyst is coated onto the first monolith and the second supported catalyst is coated onto the second monolith.

The first supported catalyst may be a platinum catalyst, a platinum—palladium catalyst, a platinum catalyst promoted with bismuth or other known promoters, or other platinum-based catalysts (e.g., Pt—Rh, Pt—Ir, Pt—Ru, Pt—Au, Pt—Ag, Pt—Rh—Ir, Pt—IR—Au, etc.). The second supported catalyst has a palladium to gold weight ratio range of about 0.05:1 to 1:0.05, preferably from about 0.5:1 to about 1:0.5, and most preferably about 0.84:1.0. Also, the second supported catalyst may be promoted with bismuth or other known promoters.

A method for preparing an engine exhaust catalyst according to an embodiment of the present invention includes the steps of preparing a first supported catalyst comprising platinum, preparing a second supported catalyst comprising palladium and gold species in close contact, and coating a substrate with the first and second supported catalysts. The first and second supported catalysts may be mixed together to form a slurry that is coated onto the substrate or may be coated onto the substrate separately.

The present invention further provides a vehicle emission control system comprising an emission control catalyst comprising a monolith and a supported catalyst containing palladium and gold species in close contact that are coated on the monolith. The vehicle emission control system further comprises a component that boosts the oxidation activity of the palladium—gold catalyst. This component may be another supported catalyst, such as a platinum-based catalyst, that is active for $NO_2$ formation and/or HC oxidation. In general, this component may be any device or material that is capable of supplying increased amounts of $NO_2$ or reduced amounts of HC to the palladium—gold catalyst.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3D illustrate different configurations of a substrate for an engine exhaust catalyst.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claims. Likewise, reference to "the invention" shall not be construed as a generalization of any inventive subject matter disclosed herein and shall not be considered to be an element or limitation of the appended claims except where explicitly recited in the claims.

FIGS. 1A-1D are schematic representations of different engine exhaust systems in which embodiments of the present invention may be used. The combustion process that occurs in an engine 102 produces harmful pollutants, such as CO, various hydrocarbons, particulate matter, and nitrogen oxides (NOx), in an exhaust stream that is discharged through a tail pipe 108 of the exhaust system.

Figure 1A:
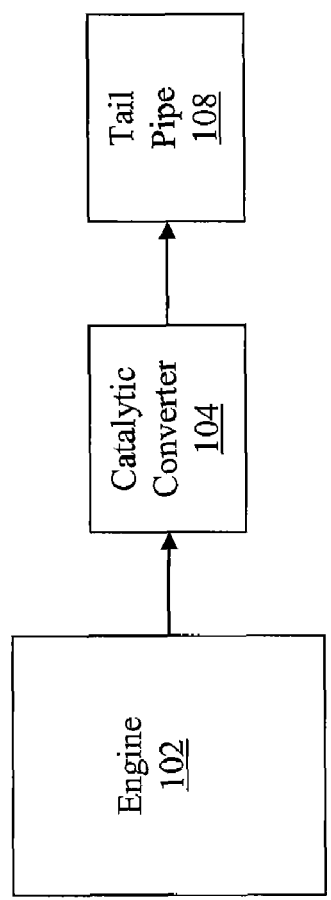
FIGS. 1A-1D are schematic representations of different engine exhaust systems in which embodiments of the present invention may be used.

In the exhaust system of FIG. 1A, the exhaust stream from an engine 102 passes through a catalytic converter 104, before it is discharged into the atmosphere (environment) through a tail pipe 108. The catalytic converter 104 contains supported catalysts coated on a monolithic substrate that treat the exhaust stream from the engine 102. The exhaust stream is treated by way of various catalytic reactions that occur within the catalytic converter 104. These reactions include the oxidation of CO to form $CO_2$, burning of hydrocarbons, and the conversion of NO to $NO_2$.

Figure 1B:
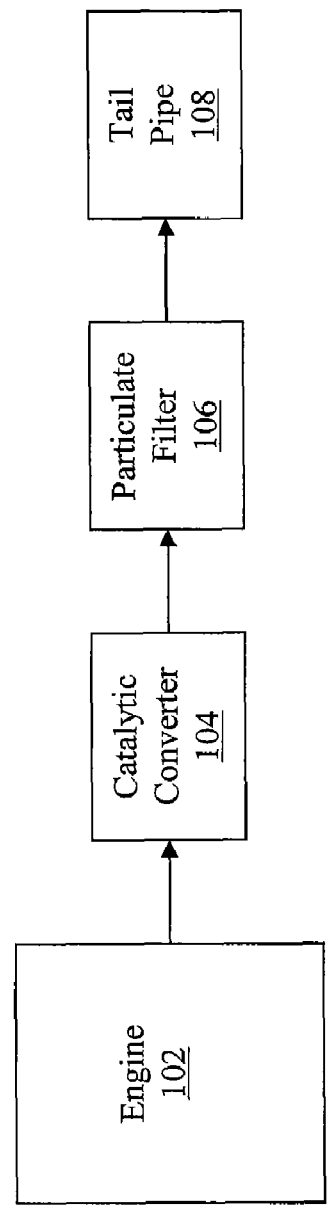

In the exhaust system of FIG. 1B, the exhaust stream from the engine 102 passes through a catalytic converter 104 and a particulate filter 106, before it is discharged into the atmosphere through a tail pipe 108. The catalytic converter 104 operates in the same manner as in the exhaust system of FIG. 1A. The particulate filter 106 traps particulate matter that is in the exhaust stream, e.g., soot, liquid hydrocarbons, generally particulates in liquid form. In an optional configuration, the particulate filter 106 includes a supported catalyst coated thereon for the oxidation of NO and/or to aid in combustion of particulate matter.

Figure 1C:
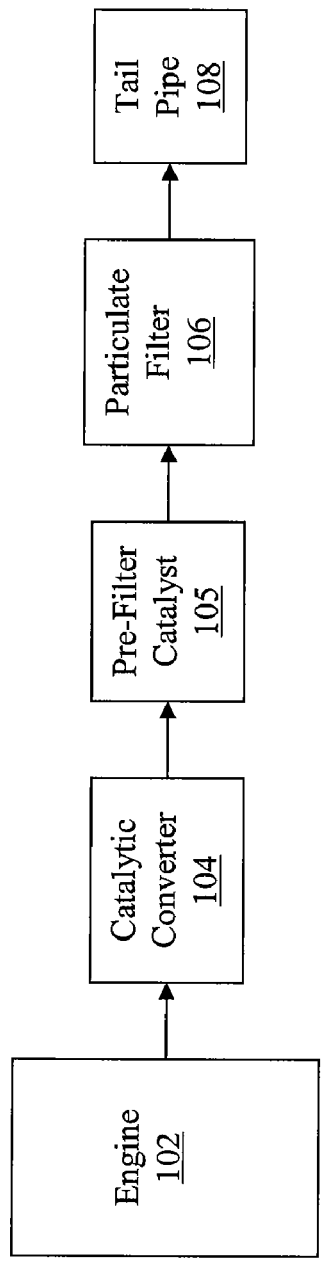

In the exhaust system of FIG. 1C, the exhaust stream from the engine 102 passes through a catalytic converter 104, a pre-filter catalyst 105 and a particulate filter 106, before it is discharged into the atmosphere through a tail pipe 108. The catalytic converter 104 operates in the same manner as in the exhaust system of FIG. 1A. The pre-filter catalyst 105 includes a monolithic substrate and supported catalysts coated on the monolithic substrate for the oxidation of NO. The particulate filter 106 traps particulate matter that is in the exhaust stream, e.g., soot, liquid hydrocarbons, generally particulates in liquid form.

Figure 1D:
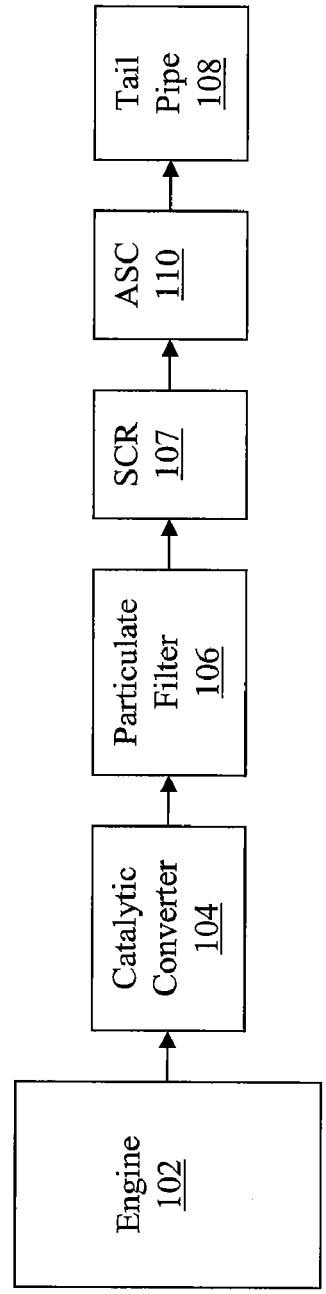

In the exhaust system of FIG. 1D, the exhaust stream passes from the engine 102 through a catalytic converter 104, a particulate filter 106, a selective catalytic reduction (SCR) unit 107 and an ammonia slip catalyst 110, before it is discharged into the atmosphere through a tail pipe 108. The catalytic converter 104 operates in the same manner as in the exhaust system of FIG. 1A. The particulate filter 106 traps particulate matter that is in the exhaust stream, e.g., soot, liquid hydrocarbons, generally particulates in liquid form. In an optional configuration, the particulate filter 106 includes a supported catalyst coated thereon for the oxidation of NO and/or to aid in combustion of particulate matter. The SCR unit 107 is provided to reduce the NOx species to $N_2$. The SCR unit 107 may be ammonia/urea based or hydrocarbon based. The ammonia slip catalyst 110 is provided to reduce the amount of ammonia emissions through the tail pipe 108. An alternative configuration places the SCR unit 107 in front of the particulate filter 106.

Alternative configurations of the exhaust system includes the provision of SCR unit 107 and the ammonia slip catalyst 110 in the exhaust system of FIG. 1A or 1C, and the provision of just the SCR unit 107, without the ammonia slip catalyst 110, in the exhaust system of FIG. 1A, 1B or 1C.

As particulates get trapped in the particulate filter within the exhaust system of FIG. 1B, 1C or 1D, it becomes less effective and regeneration of the particulate filter becomes necessary. The regeneration of the particulate filter can be either passive or active. Passive regeneration occurs automatically in the presence of $NO_2$. Thus, as the exhaust stream containing $NO_2$ passes through the particulate filter, passive regeneration occurs. During regeneration, the particulates get oxidized and $NO_2$ gets converted back to NO. In general, higher amounts of $NO_2$ improve the regeneration performance, and thus this process is commonly referred to as $NO_2$ assisted oxidation. However, too much $NO_2$ is not desirable because excess $NO_2$ is released into the atmosphere and $NO_2$ is considered to be a more harmful pollutant than NO. The $NO_2$ used for regeneration can be formed in the engine during combustion, from NO oxidation in the catalytic converter 104, from NO oxidation in the pre-filter catalyst 105, and/or from NO oxidation in a catalyzed version of the particulate filter 106.

Active regeneration is carried out by heating up the particulate filter 106 and oxidizing the particulates. At higher temperatures, $NO_2$ assistance of the particulate oxidation becomes less important. The heating of the particulate filter 106 may be carried out in various ways known in the art. One way is to employ a fuel burner which heats the particulate filter 106 to particulate combustion temperatures. Another way is to increase the temperature of the exhaust stream by modifying the engine output when the particulate filter load reaches a pre-determined level.

The present invention provides an engine exhaust catalyst that is to be used in the catalytic converter 104 shown in FIGS. 1A-1D, or generally as a catalyst in any vehicle emission control system, including as a diesel oxidation catalyst, a diesel filter catalyst, an ammonia-slip catalyst, an SCR catalyst, or as a component of a three-way catalyst. The present invention further provides a vehicle emission control system, such as the ones shown in FIGS. 1A-1D, comprising an emission control catalyst comprising a monolith and a supported catalyst containing palladium and gold species in close contact that are coated on the monolith. The vehicle emission control system may further comprise a component that boosts the oxidation activity of the palladium—gold catalyst. This component may be another supported catalyst, such as a platinum-based catalyst, that increases the rate of $NO_2$ formation and HC oxidation. Generally, this component may be any device or material that is capable of supplying increased amounts of $NO_2$ or reduced amounts of HC to the palladium—gold catalyst.

The engine exhaust catalyst according to various embodiments of the present invention includes a substrate, a first supported catalyst coated onto the substrate, and a second supported catalyst comprising palladium and gold species in close contact coated onto the substrate. The first supported catalyst may be a platinum-based catalyst, e.g., a platinum-only catalyst, a platinum—palladium catalyst, a platinum catalyst promoted with bismuth or other known promoters, or other platinum-based catalysts (e.g., Pt—Rh, Pt—Ir, Pt—Ru, Pt—Au, Pt—Ag, Pt—Rh—Ir, Pt—IR—Au, etc.). The second supported catalyst has a palladium to gold weight ratio range of about 0.05:1 to 1:0.05, preferably from about 0.5:1 to about 1:0.5, and most preferably about 0.84:1.0. Also, the second supported catalyst may be promoted with bismuth or other known promoters.

Embodiments of the present invention provide flexibility in the catalyst system design. It provides the catalyst system designer with opportunities to optimize performance versus cost by changing the weight ratio of palladium to gold, and the weight ratio of Pt-based component to Pd—Au component (or the weight ratio of a non Pt-based NO oxidizing and/or hydrocarbon oxidizing/cracking component to Pd—Au component). This flexibility is valuable because the prices of Pt, Au, and Pd are volatile. The cost ratio of Pt:Au:Pd is approximated herein as 4:2:1 and this ratio has been used when formulating catalyst compositions of equal cost. In addition, the tuning will be based upon the inherent level of engine-out CO, hydrocarbons, and NOx species as well as the engine-out temperatures and possible catalyst positions (close-coupled vs. under-floor, etc.).

Figure 2:
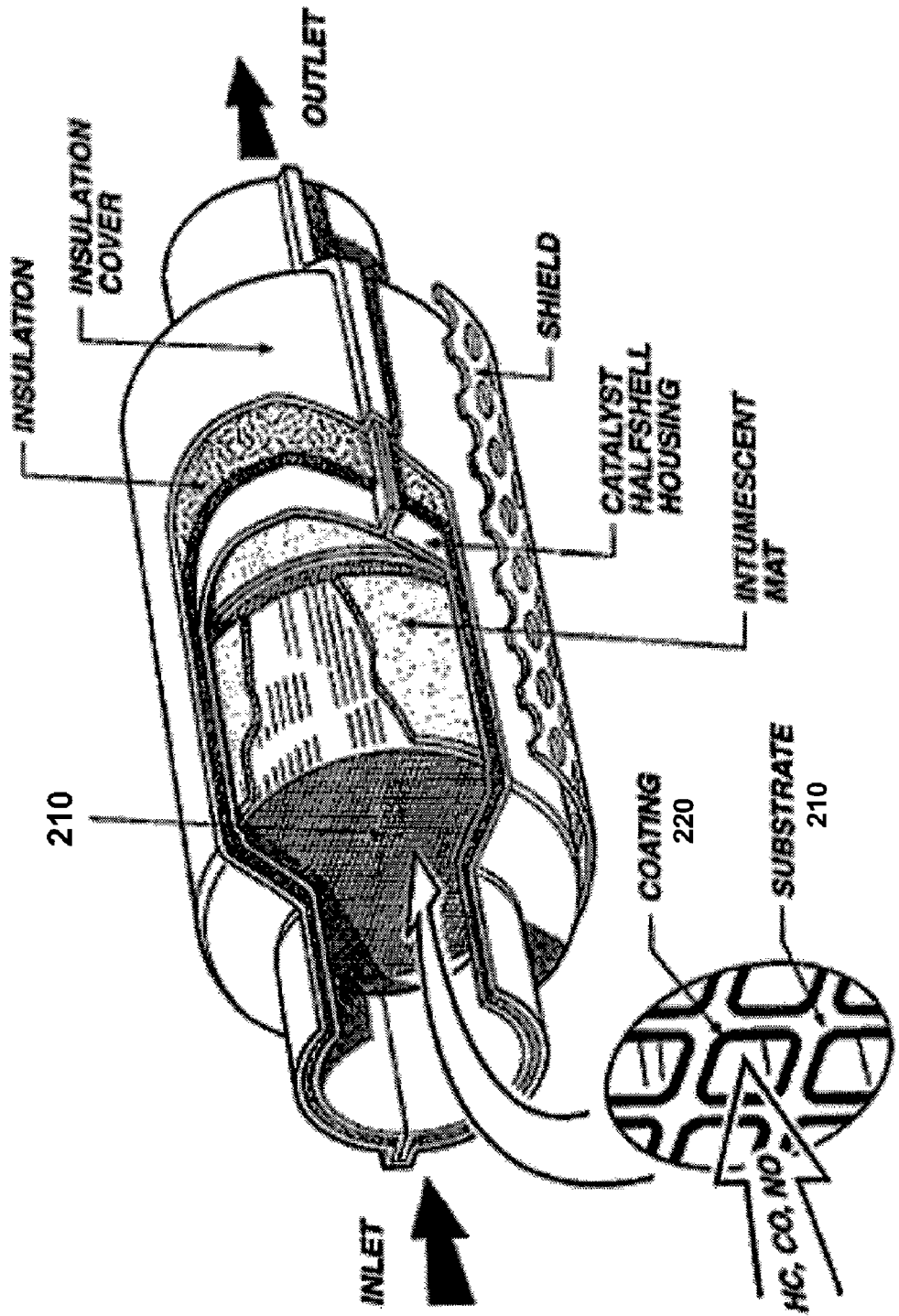
FIG. 2 is an illustration of a catalytic converter with a cut-away section that shows a substrate onto which engine exhaust catalysts according to embodiments of the present invention are coated.

FIG. 2 is an illustration of a catalytic converter with a cut-away section that shows a substrate 210 onto which engine exhaust catalysts according to embodiments of the present invention are coated. The exploded view of the substrate 210 shows that the substrate 210 has a honeycomb structure comprising a plurality of channels into which engine exhaust catalysts are flowed in slurry form so as to form coating 220 on the substrate 210.

FIGS. 3A and 3B illustrate different configurations of coating 220. In FIG. 3A, coating 220 comprises a single layer on top of substrate 210. The single layer includes the engine exhaust catalyst comprising the first supported catalyst and the second supported catalyst. In FIG. 3B, coating 220 comprises multiple layers 221, 222, 223. The outer layer 221 includes the first supported catalyst. The buffer layer 222 includes supported palladium particles, alumina-based or ceria-based blank support, zeolite, zeolite+the alumina-based or ceria-based blank support, or zeolite+a layer of supported palladium particles. The inner layer 223 includes the second supported catalyst FIGS. 3C and 3D illustrate different configurations of substrate 210. In FIG. 3C, the substrate 210 is a single monolith but is divided into two zones, a first zone 210A and a second zone 210B. The first zone 210A is positioned to encounter the exhaust stream before the second zone 210B. Using methods known in the art, the first supported catalyst in powder form is mixed in a solvent to form a slurry and the slurry is coated onto the first zone 210A, and the second supported catalyst in powder form is mixed in a solvent to form a slurry and the slurry is coated onto the second zone 210B. In FIG. 2D, the substrate 210 comprises two separate but adjacent monoliths, a first monolith 231 and a second monolith 232. The first monolith 231 is positioned to encounter the exhaust stream before the second monolith 232. Using methods known in the art, the first supported catalyst in powder form is mixed in a solvent to form a slurry and the slurry is coated onto the first monolith 231, and the second supported catalyst in powder form is mixed in a solvent to form a slurry and the slurry is coated onto the second monolith 232.

It is preferred that the first supported catalyst is positioned upstream of the exhaust flow with respect to the second supported catalyst, because upstream $NO_2$ generation and/or hydrocarbon oxidation/cracking may reduce the hydrocarbon inhibition effects inherent to Pd—Au in the second supported catalyst. However, it is also possible to position the second supported catalyst upstream of the exhaust flow with respect to the first supported catalyst. This alternative configuration would not be as beneficial as the preferred configuration, but it may still provide a boost in the CO oxidation activity.

Figure 4:
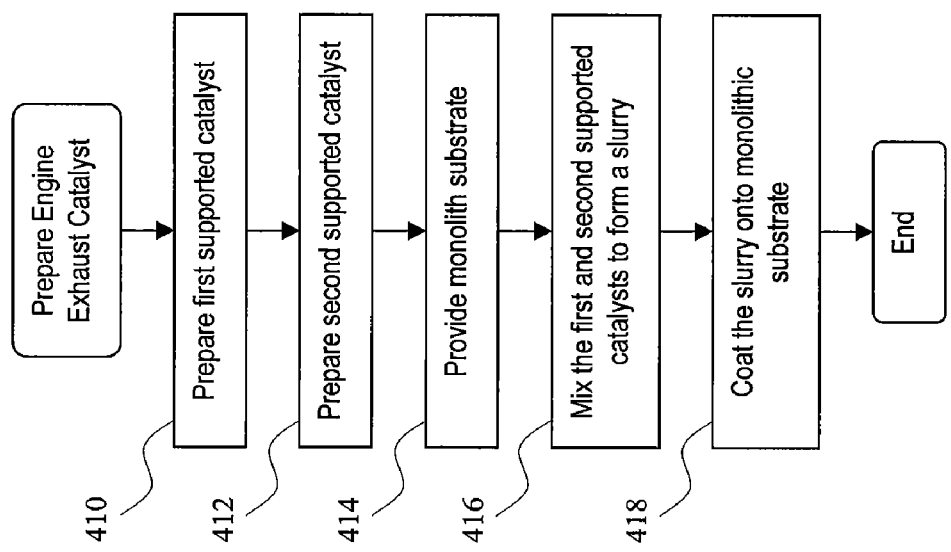
FIG. 4 is a flow diagram illustrating the steps for preparing an engine exhaust catalyst according to an embodiment of the present invention.

FIG. 4 is a flow diagram that illustrates the steps for preparing an engine exhaust catalyst according to embodiments of the present invention using the substrate 210 of FIG. 3A. In step 410, the first supported catalyst, e.g., a platinum-based catalyst, is prepared is accordance with known methods or with the methods described in U.S. patent application Ser. No. 11/342,166, filed Jan. 26, 2006, the contents of which are incorporated by reference herein, and in U.S. Provisional Patent Application Ser. No. 60/866,566, filed Nov. 20, 2006, the contents of which are incorporated by reference herein. In step 412, the second supported catalyst is prepared in accordance with known methods or with the methods described in U.S. patent application Ser. No. 11/533,220, filed Sep. 19, 2006. A monolithic substrate, such as substrate 210 shown in FIG. 2, is provided in step 414. Exemplary monolithic substrates include those that are ceramic (e.g., cordierite), metallic, or silicon carbide based. Then, the first and second supported catalysts in powder form are mixed in a solvent to form a slurry (step 416) and the slurry is then coated onto the monolithic substrate (step 418).

Figure 5:
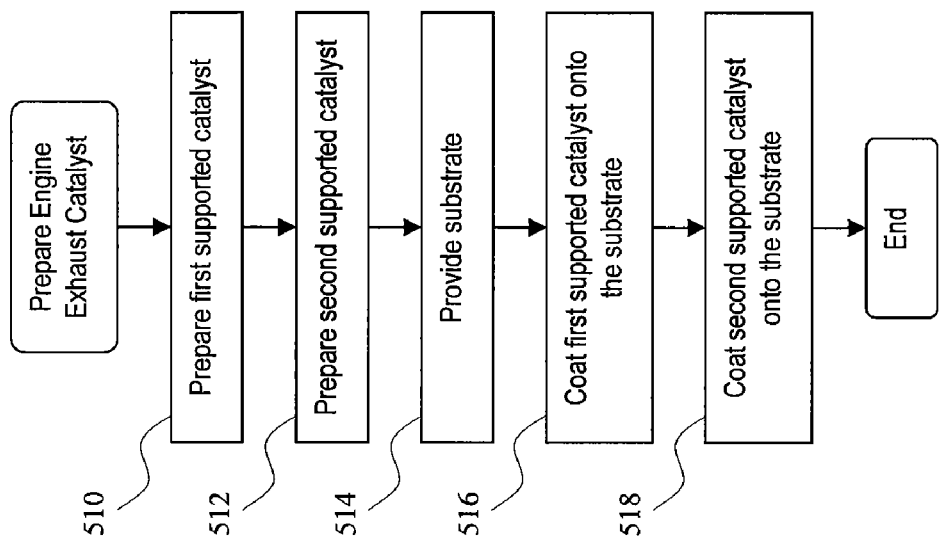
FIG. 5 is a flow diagram illustrating the steps for preparing an engine exhaust catalyst according to another embodiment of the present invention.

FIG. 5 is a flow diagram that illustrates the steps for preparing an engine exhaust catalyst according to embodiments of the present invention using the substrate 210 of FIGS. 3B, 3C and 3D. In step 510, the first supported catalyst, e.g., a platinum-based catalyst, is prepared is accordance with known methods or with the methods described in U.S. patent application Ser. No. 11/342,166, filed Jan. 26, 2006, and in U.S. Provisional Patent Application Ser. No. 60/866,566, filed Nov. 20, 2006. In step 512, the second supported catalyst is prepared in accordance with known methods or with the methods described in U.S. patent application Ser. No. 11/533, 220, filed Sep. 19, 2006. A substrate, such as substrate 210 shown in FIG. 2, 3C or 3D, is provided in step 514. Then, the first supported catalyst in powder form are mixed in a solvent to form a slurry and the slurry is then coated as a particular layer on the substrate or onto a particular zone or monolith of the substrate (step 516), and the second supported catalyst in powder form are mixed in a solvent to form a slurry and the slurry is then coated as another layer on the substrate or onto a different zone or monolith of the substrate (step 518).

The data representing CO oxidation performance of the various embodiments of the present invention are provided in Tables 1-3 below. The inventors have observed improved CO oxidation performance with the engine exhaust catalyst according to embodiments of the present invention when compared with a platinum—palladium catalyst of equal cost. The comparison is made against a platinum—palladium catalyst, because it is expected that platinum—palladium catalysts will be replacing platinum-only catalysts as the standard for stable diesel oxidation catalysts in many markets in the near future. Table 1 represents a single-brick, single-zone, single-layer system such as the one described with reference to FIG. 3A. Table 2 represents a dual-brick system such as the one described with reference to FIG. 3D. Table 3 represents a multi-layer system such as the one described with reference to FIG. 3B.

TABLE 1

| Example | Catalyst 1 supported on La-doped alumina | Catalyst 2 supported on La-doped alumina | CO emissions (g/km) |
|---|---|---|---|
| 1 | PtPd (2:1 by weight) at 120 g/ft$^3$ | None | 0.222 |
| 2 | Pt at 60 g/ft$^3$ | PdAu (0.85:1.0 by weight) at 73 g/ft$^3$ | 0.181 |
| 3 | PtPd (2:1 by weight) at 85 g/ft$^3$ | PdAu (0.85:1.0 by weight) at 73 g/ft$^3$ | 0.104 |

TABLE 1-continued

| Example | Catalyst 1 supported on La-doped alumina | Catalyst 2 supported on La-doped alumina | CO emissions (g/km) |
|---|---|---|---|
| 4 | PtBi (1.5:1 by weight) at 60 g/ft$^3$ of Pt | PdAu (0.85:1.0 by weight) at 73 g/ft$^3$ | 0.087 |

TABLE 2

| Example | Brick 1 (5.66" × 1.25") | Brick 2 (5.66" × 1.25") | CO emissions (g/km) |
|---|---|---|---|
| 5 | PtPd (2:1 by weight) at 170 g/ft$^3$ | Blank | 0.171 |
| 6 | PtPd (2:1 by weight) at 170 g/ft3 | PdAu (0.85:1.0 by weight) at 146 g/ft$^3$ | 0.065 |
| 7 | PtBi (1.5:1 by weight) at 120 g/ft$^3$ of Pt | PdAu (0.85:1.0 by weight) at 146 g/ft$^3$ | 0.078 |

TABLE 3

| Example | Outer Layer | Buffer Layer | Inner Layer | CO emissions (g/km) |
|---|---|---|---|---|
| 8 | PtPd (2:1 by weight) at 85 g/ft$^3$ | Pd supported on a Rare Earth Oxide at 30 g/ft$^3$ | PdAu (0.85:1.0 by weight) at 73 g/ft$^3$ | 0.137 |

The data presented in Tables 1, 2 and 3 above reflect the fresh CO oxidation vehicle performance for a number of catalysts. The CO oxidation performance is presented as CO emissions measured from the tail pipe of a light-duty diesel vehicle (model year 2005) using bag data from the standard European MVEG test. The catalysts were coated on cordierite substrates with a diameter of 5.66 inches by 2.5 inches, unless otherwise noted. Note that Examples 2, 3, 4, 6, 7, and 8 contain precious metals (Pt, Pd, and Au) of approximately equal cost to those in the benchmark Pt—Pd only system (Example 1). Enhancement to performance beyond that of the benchmark Pt—Pd catalyst is observed when the embodiment of the present invention employing coating a physical mixture of a Pt-based catalyst and a Pd—Au catalyst is used (Examples 2, 3, and 4). Data in Tables 2 and 3 indicate that a performance enhancement is also realized in further embodiments of the present invention when multiple substrates with a Pt-based catalyst and a Pd—Au catalyst (Examples 6 and 7) or multi-layers of a Pt-based catalyst and a Pd—Au catalyst on a single substrate (Example 8) are employed (all at approximately equal cost to the benchmark Pt—Pd catalyst). It is noted that when the Pt—Pd brick from Example 6 is used in combination with a blank brick in place of the Pd—Au brick (as a control), the performance is not nearly as good (see Example 5) as when the Pd—Au is present. As a further benchmark, the performance of a Pd—Au only system (Pd: Au=0.85:1.0 by weight at 140 g/ft$^3$) was tested. The CO emissions from that system were observed to be 0.398 g/km.

Deterioration in the CO oxidation performance has been experimentally observed by the inventors after aging the Pt-based and Pd—Au-containing physically mixed catalysts (Examples 2, 3, 4). When these catalysts are subject to elevated temperatures for prolonged periods of time, beyond the well-known phenomenon of metal sintering, another pathway for performance degradation via sintering and formation of less active ternary alloys (Pt—Pd—Au) in these systems has been discovered. Experimental data show that the deactivation of the engine exhaust catalyst containing a first supported catalyst comprising platinum and a second supported catalyst comprising palladium—gold particles is caused by the formation of a ternary alloy (Pt—Pd—Au). FIGS. 3B-3D illustrate three different configurations of a substrate 210 of an engine exhaust catalyst that is designed to suppress these catalyst aging effects and allow maximum performance. The three configurations of the substrate 210 described above suppress the formation of the ternary alloy by keeping the platinum physically separate from palladium—gold. Fresh vehicle CO emission data for examples of some of the above described configurations are shown in Tables 2 and 3. It is clear that the benefits of combining a Pt-based catalyst with a Pd—Au catalyst are maintained while the possibility of forming a ternary alloy upon extensive aging has been significantly reduced in the case of multi-layer systems or eliminated completely in the case of multi-brick systems.

For the tri-layered approach of FIG. 3B, ceria-based materials in the buffer layer might further slow down Pt migration and suppress ternary alloy formation. See Nagai, et. al., "Sintering inhibition mechanism of platinum supported on ceria-based oxide and Pt-oxide-support interaction," *J. Catal. Vol.* 242, pp. 103-109 (2006). A palladium-containing buffer layer will allow formation of additional binary alloys upon sintering and slow down the sintering process as alloys tend to sinter less than individual metals.

The preparation methods for Examples 1-8 were as follows:

Preparation of a 1.67% Pd, 2.0% Au Supported PdAu Catalyst.

Lanthanum-stabilized alumina (578 g, having a surface area of ~200 $m^2g^{-1}$) and 2940 mL of de-ionized water (>18MΩ) were added to a 5 L plastic beaker and magnetically stirred at about 500 rpm. The pH measured was 8.5 and the temperature measured was 25° C. After 20 minutes, $Pd(NO_3)_2$ (67.8 g of 14.8% aqueous solution) was gradually added over a period of 10 min. The pH measured was 4.3. After stirring for 20 minutes, a second metal, $HAuCl_4$ (24 g dissolved in 50 mL of de-ionized water), was added over a period of 5 min. The pH was 4.0 and the temperature of the metal-support slurry was 25° C. The metal-support slurry was stirred for an additional 30 min. In a second vessel, $NaBH_4$ (29.4 g) and NaOH (31.1 g) were added to $N_2H_4$ (142 mL of 35% aqueous solution) and stirred until the mixture became clear. This mixture constituted the reducing agent mixture. The metal-support slurry and reducing agent mixture were combined continuously using two peristaltic pumps. The two streams were combined using a Y joint connected to a Vigreux column to cause turbulent mixing. The reaction product leaving the mixing chamber, i.e., the Vigreux column, was pumped into an intermediate vessel of smaller volume and continuously stirred. The product in the intermediate vessel was continuously pumped into a larger vessel, i.e., 5 L beaker, for residence and with continued stirring. The entire addition/mixing process lasted about 30 min. The resulting product slurry was stirred in the larger vessel for an additional period of 1 h. The final pH was 11.0 and the temperature was 25° C. The product slurry was then filtered using vacuum techniques via Buchner funnels provided with a double layer of filter paper having 3 µm porosity. The filter cake was then washed with about 20 L of de-ionized water in several approximately equal portions. Thereafter, the washed cake was dried at 110° C., ground to a fine powder using a mortar and pestle, and subsequently calcined at 500° C. for 2 h, with a heating rate of 8° C. $min^{-1}$. This supported PdAu catalyst powder (1.67% Pd, 2.0% Au) was used in preparing Examples 2, 3, 4, 6, 7, and 8.

Preparation of a 2.8% Pt, 1.4% Pd Supported Catalyst.

To 10 L of de-ionized $H_2O$ was added 1940 g of La-stabilized alumina (having a BET surface area of ~200 $m^2$ $g^{-1}$) followed by stirring for 30 minutes at room temperature. To this slurry was added 490.6 g of $Pt(NO_3)_2$ solution (12.23% $Pt(NO_3)_2$ by weight), followed by stirring at room temperature for 60 minutes. Acrylic acid (750 mL, 99% purity) was then added into the system over 12 minutes and the resulting mixture was allowed to continue stirring at room temperature for 2 hours. The solid La-doped alumina supported Pt catalyst was separated from the liquid via filtration, dried at 120° C. for 2 hours, ground into a fine powder, and calcined in air for 2 hours at a temperature of 500° C. (heated at 8° C. $min^{-1}$) to give a 3% Pt material.

To 9.25 L of de-ionized $H_2O$ was added 1822 g of the above 3% Pt material followed by stirring for 20 minutes at room temperature. To this slurry was added 194.4 g of $Pd(NO_3)_2$ solution (14.28% $Pd(NO_3)_2$ by weight), followed by stirring at room temperature for 60 minutes. An aqueous ascorbic acid solution (930 g in 4.5 L of de-ionized $H_2O$) was then added over 25 minutes followed by stirring for 60 minutes. The solid La-doped alumina supported PtPd catalyst was separated from the liquid via filtration, dried at 120° C. for 2 hours, ground into a fine powder, and calcined in air for 2 hours at a temperature of 500° C. (heated at 8° C. $min^{-1}$) to give a 3% Pt, 1.5% Pd material. This material was diluted to 2.8% Pt, 1.4% Pd via addition of blank La-doped alumina support and the diluted mixture was used in preparing Examples 3, 5, 6, and 8.

Preparation of a 2.0% Pt, 1.0% Pd Supported Catalyst.

To 10 L of de-ionized $H_2O$ was added 2000 g of La-stabilized alumina (having a BET surface area of ~200 $m^2$ $g^{-1}$) followed by stirring for 30 minutes at room temperature. To this slurry was added 327.1 g of $Pt(NO_3)_2$ solution (12.23% $Pt(NO_3)_2$ by weight), followed by stirring at room temperature for 60 minutes. Acrylic acid (500 mL, 99% purity) was then added into the system over 12 minutes and the resulting mixture was allowed to continue stirring at room temperature for 2 hours. The solid La-doped alumina supported Pt catalyst was separated from the liquid via filtration, dried at 120° C. for 2 hours, ground into a fine powder, and calcined in air for 2 hours at a temperature of 500° C. (heated at 8° C. $min^{-1}$) to give a 2% Pt material.

To 9.5 L of de-ionized $H_2O$ was added 1900 g of the above 2% Pt material followed by stirring for 20 minutes at room temperature. To this slurry was added 135.3 g of $Pd(NO_3)_2$ solution (14.28% $Pd(NO_3)_2$ by weight), followed by stirring at room temperature for 60 minutes. An aqueous ascorbic acid solution (647.2 g in 3.5 L of de-ionized $H_2O$) was then added over 25 minutes followed by stirring for 60 minutes. The solid La-doped alumina supported PtPd catalyst was separated from the liquid via filtration, dried at 120° C. for 2 hours, ground into a fine powder, and calcined in air for 2 hours at a temperature of 500° C. (heated at 8° C. $min^{-1}$) to give a 2% Pt, 1% Pd material. This material was used in preparing Example 1, the benchmark PtPd catalyst.

Preparation of a 3.0% Pt, 2.0% Bi Supported Catalyst.

To 10 L of de-ionized $H_2O$ was added 2000 g of La-stabilized alumina (having a BET surface area of ~200 $m^2$ $g^{-1}$) followed by stirring for 30 minutes at room temperature.

To this slurry was added 436.1 g of Pt(NO$_3$)$_2$ solution (13.76% Pt(NO$_3$)$_2$ by weight), followed by stirring at room temperature for 60 minutes. Acrylic acid (750 mL, 99% purity) was then added into the system over 12 minutes and the resulting mixture was allowed to continue stirring at room temperature for 2 hours. The solid La-doped alumina supported Pt catalyst was separated from the liquid via filtration, dried at 120° C. for 2 hours, ground into a fine powder, and calcined in air for 2 hours at a temperature of 500° C. (heated at 8° C. min$^{-1}$).

To 1600 g of the La-stabilized alumina supported 3% Pt catalyst prepared above was added a solution of bismuth acetate (59.1 g of bismuth acetate in 1.4 L of de-ionized H$_2$O and 0.25 L of glacial acetic acid). The resulting paste was mechanically mixed at room temperature for 10 minutes, dried at 120° C. for 2 hours, ground into a fine powder, and calcined in air for 2 hours at a temperature of 500° C. (heated at 8° C. min$^{-1}$) providing the final supported 3.0% Pt, 2.0% Bi catalyst used in preparing Examples 4 and 7.

Preparation of a 3.0% Pd Supported Catalyst.

To 5 L of de-ionized H$_2$O was added 1000 g of a rare-earth oxide support (ceria-zirconia based with a surface area of ~90 m$^2$ g$^{-1}$) followed by stirring for 20 minutes at room temperature. To this slurry was added 211.8 g of Pd(NO$_3$)$_2$ solution (14.28% Pd(NO$_3$)$_2$ by weight), followed by stirring at room temperature for 60 minutes. An aqueous ascorbic acid solution (1013 g in 5 L of deionized H$_2$O) was then added over 25 minutes followed by stirring for 60 minutes. The solid La-doped alumina supported PtPd catalyst was separated from the liquid via filtration, dried at 120° C. for 2 hours, ground into a fine powder, and calcined in air for 2 hours at a temperature of 500° C. (heated at 8° C. min$^{-1}$) to give a supported 3% Pd material. This material was used in preparing Example 8.

EXAMPLE 1

Benchmark Pt/Pd at 120 g/ft3

The supported PtPd catalyst powder (2.0% Pt, 1.0% Pd) prepared above was made into a washcoat slurry via addition to de-ionized water, milling to an appropriate particle size (typically with a d$_{50}$ range from 3 to 7 μm), and pH adjustment to give an appropriate viscosity for washcoating. According to methods known in the art, the washcoat slurry was coated onto a round cordierite monolith (Corning, 400 cpsi, 5.66 inches×2.5 inches), dried at 120° C. and calcined at 500° C. to give the final coated monolith with a precious metal (Pt+Pd) loading of 120 g/ft$^3$. The coated monolith was canned according to methods known in the art and tested using a certified testing facility on a light-duty diesel vehicle, as described above.

EXAMPLE 2

Mixture of Pt (at 60 g/ft3) and PdAu (at 73 g/ft3)

The supported Pt catalyst powder (3.0% Pt) and the supported PdAu catalyst powder (1.67% Pd, 2.0% Au) prepared via the methods described above were physically mixed and made into a washcoat slurry via addition to de-ionized water, milling to an appropriate particle size (typically with a d$_{50}$ range from 3 to 7 μm), and pH adjustment to give an appropriate viscosity for washcoating. According to methods known in the art, the washcoat slurry was coated onto a round cordierite monolith (Corning, 400 cpsi, 5.66 inches×2.5 inches), dried at 120° C. and calcined at 500° C. to give the final coated monolith with precious metal loadings of 60 g/ft$^3$ Pt and 73 g/ft$^3$ PdAu (total precious metal loading of 133 g/ft$^3$). The coated monolith was canned according to methods known in the art and tested using a certified testing facility on a light-duty diesel vehicle, as described above. Note that the precious metal cost of this coated monolith is approximately equal to that of the benchmark PtPd catalyst (Example 1).

EXAMPLE 3

Mixture of PtPd (at 85 g/ft3) and PdAu (at 73 g/ft3)

The supported PtPd catalyst powder (2.8% Pt, 1.4% Pd) and the supported PdAu catalyst powder (1.67% Pd, 2.0% Au) prepared via the methods described above were physically mixed and made into a washcoat slurry via addition to de-ionized water, milling to an appropriate particle size (typically with a d$_{50}$ range from 3 to 7 μm), and pH adjustment to give an appropriate viscosity for washcoating. According to methods known in the art, the washcoat slurry was coated onto a round cordierite monolith (Corning, 400 cpsi, 5.66 inches×2.5 inches), dried at 120° C. and calcined at 500° C. to give the final coated monolith with precious metal loadings of 85 g/ft$^3$ PtPd and 73 g/ft$^3$ PdAu (total precious metal loading of 158 g/ft$^3$). The coated monolith was canned according to methods known in the art and tested using a certified testing facility on a light-duty diesel vehicle, as described above. Note that the precious metal cost of this coated monolith is approximately equal to that of the benchmark PtPd catalyst (Example 1).

EXAMPLE 4

Mixture of PtBi (at 60 g/ft3) and PdAu (at 73 g/ft3)

The supported PtBi catalyst powder (3.0% Pt, 2.0% Bi) and the supported PdAu catalyst powder (1.67% Pd, 2.0% Au) prepared via the methods described above were physically mixed and made into a washcoat slurry via addition to de-ionized water, milling to an appropriate particle size (typically with a d$_{50}$ range from 3 to 7 μm), and pH adjustment to give an appropriate viscosity for washcoating. According to methods known in the art, the washcoat slurry was coated onto a round cordierite monolith (Corning, 400 cpsi, 5.66 inches×2.5 inches), dried at 120° C. and calcined at 500° C. to give the final coated monolith with precious metal loadings of 60 g/ft$^3$ Pt and 73 g/ft$^3$ PdAu (total precious metal loading of 133 g/ft$^3$). The coated monolith was canned according to methods known in the art and tested using a certified testing facility on a light-duty diesel vehicle, as described above. Note that the precious metal cost of this coated monolith is approximately equal to that of the benchmark PtPd catalyst (Example 1).

EXAMPLE 5

Multi-Brick Control: Pt/Pd (at 170 g/ft3) Inlet and a Blank Outlet

The supported PtPd catalyst powder (2.8% Pt, 1.4% Pd) prepared as described above was made into a washcoat slurry via addition to de-ionized water, milling to an appropriate particle size (typically with a d$_{50}$ range from 3 to 7 μm), and pH adjustment to give an appropriate viscosity for washcoating. According to methods known in the art, the washcoat slurry was coated onto a round cordierite monolith (Corning, 400 cpsi, 5.66 inches×1.25 inches), dried at 120° C. and calcined at 500° C. to give the final coated monolith with a precious metal loading of 170 g/ft³ PtPd. This represented the inlet brick of a two brick system. In addition, a blank cordierite monolith of equal size (Corning, 400 cpsi, 5.66 inches×1.25 inches) was designated as the outlet brick. The coated monolith and the blank brick were then canned according to methods known in the art such that the inlet brick was closest to the engine (and hence would be exposed to the exhaust first), and tested using a certified testing facility on a light-duty diesel vehicle, as described above.

EXAMPLE 6

Multi-Brick: Pt/Pd (at 170 g/ft3) Inlet and PdAu (at 146 g/ft3) Outlet

The supported PtPd catalyst powder (2.8% Pt, 1.4% Pd) prepared as described above was made into a washcoat slurry via addition to de-ionized water, milling to an appropriate particle size (typically with a $d_{50}$ range from 3 to 7 µm), and pH adjustment to give an appropriate viscosity for washcoating. According to methods known in the art, the washcoat slurry was coated onto a round cordierite monolith (Corning, 400 cpsi, 5.66 inches×1.25 inches), dried at 120° C. and calcined at 500° C. to give the final coated monolith with a precious metal loading of 170 g/ft³ PtPd. This represented the inlet brick of a two brick system.

In addition, the supported PdAu catalyst powder (1.67% Pd, 2.0% Au) prepared as described above was made into a washcoat slurry via addition to de-ionized water, milling to an appropriate particle size (typically with a $d_{50}$ range from 3 to 7 µm), and pH adjustment to give an appropriate viscosity for washcoating. According to methods known in the art, the washcoat slurry was coated onto a round cordierite monolith (Corning, 400 cpsi, 5.66 inches×1.25 inches), dried at 120° C. and calcined at 500° C. to give the final coated monolith with a precious metal loading of 146 g/ft³ PdAu. This represented the outlet brick of a two brick system.

The coated PtPd monolith (inlet brick) and the coated PdAu monolith (outlet brick) were then canned according to methods known in the art such that the inlet brick was closest to the engine (and hence would be exposed to the exhaust first), and tested using a certified testing facility on a light-duty diesel vehicle, as described above. Note that the precious metal cost of this coated monolith is approximately equal to that of the benchmark PtPd catalyst (Example 1).

EXAMPLE 7

Multi-Brick: PtBi (at 120 g/ft3) Inlet and PdAu (at 146 g/ft3) Outlet

The supported PtBi catalyst powder (3.0% Pt, 2.0% Bi) prepared as described above was made into a washcoat slurry via addition to de-ionized water, milling to an appropriate particle size (typically with a $d_{50}$ range from 3 to 7 µm), and pH adjustment to give an appropriate viscosity for washcoating. According to methods known in the art, the washcoat slurry was coated onto a round cordierite monolith (Corning, 400 cpsi, 5.66 inches×1.25 inches), dried at 120° C. and calcined at 500° C. to give the final coated monolith with a precious metal loading of 120 g/ft³ Pt. This represented the inlet brick of a two brick system.

In addition, the supported PdAu catalyst powder (1.67% Pd, 2.0% Au) prepared as described above was made into a washcoat slurry via addition to de-ionized water, milling to an appropriate particle size (typically with a $d_{50}$ range from 3 to 7 µm), and pH adjustment to give an appropriate viscosity for washcoating. According to methods known in the art, the washcoat slurry was coated onto a round cordierite monolith (Corning, 400 cpsi, 5.66 inches×1.25 inches), dried at 120° C. and calcined at 500° C. to give the final coated monolith with a precious metal loading of 146 g/ft³ PdAu. This represented the outlet brick of a two brick system.

The coated PtBi monolith (inlet brick) and the coated PdAu monolith (outlet brick) were then canned according to methods known in the art such that the inlet brick was closest to the engine (and hence would be exposed to the exhaust first), and tested using a certified testing facility on a light-duty diesel vehicle, as described above. Note that the precious metal cost of this coated monolith is approximately equal to that of the benchmark PtPd catalyst (Example 1).

EXAMPLE 8

Multi-Layer: PdAu (at 73 g/ft3) 1st Layer, Pd (at 30 g/ft3) 2nd Layer PtPd (at 85 g/ft3) 3rd Layer The supported PdAu catalyst powder (1.67% Pd, 2.0% Au) prepared above was made into a washcoat slurry via addition to de-ionized water, milling to an appropriate particle size (typically with a $d_{50}$ range from 3 to 7 µm), and pH adjustment to give an appropriate viscosity for washcoating. According to methods known in the art, the washcoat slurry was coated onto a round cordierite monolith (Corning, 400 cpsi, 5.66 inches×2.5 inches), dried at 120° C. and calcined at 500° C. to give the first layer of the multi-layer coated monolith.

Then, the supported Pd catalyst powder (3.0% Pd) prepared above was made into a washcoat slurry via addition to de-ionized water, milling to an appropriate particle size (typically with a $d_{50}$ range from 3 to 7 µm), and pH adjustment to give an appropriate viscosity for washcoating. According to methods known in the art, the Pd washcoat slurry was coated onto the multi-layer coated cordierite monolith (with the 1$^{st}$ layer of PdAu) such that the Pd loading was ~30 g/ft³ after appropriate drying at 120° C. and calcination at 500° C. to give the second layer of the multi-layer coated monolith.

Then, the supported PtPd catalyst powder (2.8% Pt, 1.4% Pd) prepared above was made into a washcoat slurry via addition to de-ionized water, milling to an appropriate particle size, and pH adjustment to give an appropriate viscosity for washcoating. According to methods known in the art, the PtPd washcoat slurry was coated onto the multi-layer coated cordierite monolith (with the 1$^{st}$ layer of PdAu and the 2$^{nd}$ layer of Pd) such that the PtPd loading was ~85 g/ft³ after appropriate drying at 120° C. and calcination at 500° C. to give the third layer of the multi-layer coated monolith.

The resulting multi-layer (tri-layer in this case) coated monolith had precious metal loadings of 73 g/ft³ PdAu (1$^{st}$ layer), 30 g/ft³ Pd (2$^{nd}$ layer), and 85 g/ft³ PtPd (3$^{rd}$ layer). The multi-layer coated monolith was canned according to methods known in the art and tested using a certified testing facility on a light-duty diesel vehicle, as described above. Note that the precious metal cost of this coated monolith is slightly higher than that of the benchmark PtPd catalyst (Example 1), due to the Pd in the second layer.

While particular embodiments according to the invention have been illustrated and described above, those skilled in the art understand that the invention can take a variety of forms and embodiments within the scope of the appended claims.

What claimed is:

1. An engine exhaust catalyst comprising a substrate carrying a first supported catalyst and a second supported catalyst, the second supported catalyst having metal particles consisting essentially of palladium and gold species, wherein the substrate comprises a first zone and a second zone, and the first supported catalyst is coated onto the first zone and the second supported catalyst is coated onto the second zone, and wherein the first zone is positioned to encounter the engine exhaust before the second zone.

2. The engine exhaust catalyst according to claim 1, wherein the first supported catalyst promotes the oxidation of NO and/or HC.

3. The engine exhaust catalyst according to claim 1, wherein the first supported catalyst comprises a platinum-based catalyst.

4. The engine exhaust catalyst according to claim 3, wherein the platinum-based catalyst comprises platinum and palladium.

5. The engine exhaust catalyst according to claim 3, wherein the platinum-based catalyst comprises platinum and bismuth.

6. An engine exhaust catalyst comprising a substrate carrying a first supported catalyst and a second supported catalyst, the second supported catalyst having metal particles consisting essentially of palladium and gold species, wherein the substrate comprises a first monolith and a second monolith, and the first supported catalyst is coated onto the first monolith and the second supported catalyst is coated onto the second monolith, and wherein the first monolith is positioned to encounter the engine exhaust before the second monolith.

7. The engine exhaust catalyst according to claim 6, wherein the first supported catalyst promotes the oxidation of NO and/or HC.

8. The engine exhaust catalyst according to claim 6, wherein the first supported catalyst comprises a platinum-based catalyst.

9. The engine exhaust catalyst according to claim 8, wherein the platinum-based catalyst comprises platinum and palladium.

10. The engine exhaust catalyst according to claim 8, wherein the platinum-based catalyst comprises platinum and bismuth.

11. An engine exhaust catalyst comprising a substrate carrying a first supported catalyst and a second supported catalyst, the second supported catalyst having metal particles consisting essentially of palladium and gold species, wherein the substrate has multiple layers coated thereon, and the first supported catalyst is coated on the substrate as an outer layer and the second supported catalyst is coated as an inner layer, and wherein the outer layer is positioned to encounter the engine exhaust before the inner layer.

12. The engine exhaust catalyst according to claim 11, wherein the multiple layers include a buffer layer between the outer layer and the inner layer.

13. The engine exhaust catalyst according to claim 12, wherein the substrate comprises a honeycomb structure having a plurality of channels, and the inner layer, the buffer layer and the outer layer are coated sequentially onto the honeycomb structure.

14. The engine exhaust catalyst according to claim 13, wherein the first supported catalyst promotes the oxidation of NO and/or HC.

15. The engine exhaust catalyst according to claim 13, wherein the first supported catalyst comprises a platinum-based catalyst.

16. The engine exhaust catalyst according to claim 15, wherein the platinum-based catalyst comprises platinum and palladium.

17. The engine exhaust catalyst according to claim 15, wherein the platinum-based catalyst comprises platinum and bismuth.

\* \* \* \* \*